United States Patent [19]

Ake

[11] Patent Number: 4,976,538

[45] Date of Patent: Dec. 11, 1990

[54] DETECTION AND DISPLAY DEVICE

[75] Inventor: DuWain K. Ake, Tipp City, Ohio

[73] Assignee: Spectra-Physics, Inc., San Jose, Calif.

[21] Appl. No.: 428,624

[22] Filed: Oct. 30, 1989

Related U.S. Application Data

[63] Continuation-in-part of Ser. No. 228,465, Aug. 5, 1988, Pat. No. 4,907,874.

[51] Int. Cl.$^5$ .......................... G01C 3/08; H01J 40/14
[52] U.S. Cl. ..................................... 356/4; 250/208.1; 356/401
[58] Field of Search ................... 356/4, 141, 152, 401; 250/208

[56] References Cited

U.S. PATENT DOCUMENTS

| | | | |
|---|---|---|---|
| 3,511,155 | 5/1970 | Yamada | 356/4 |
| 3,649,122 | 3/1972 | Holtz | 356/4 |
| 4,062,634 | 12/1977 | Rando et al. . | |
| 4,071,297 | 1/1978 | Leitz et al. | 356/4 |
| 4,240,208 | 12/1980 | Pehrson . | |
| 4,674,069 | 6/1987 | Mizuno . | |
| 4,676,634 | 6/1987 | Petersen . | |
| 4,725,136 | 2/1988 | McCullough et al. | 356/28 |
| 4,732,471 | 3/1988 | Cain et al. . | |

*Primary Examiner*—Stephen C. Buczinski
*Attorney, Agent, or Firm*—Killworth, Gottman, Hagan and Schaeff

[57] ABSTRACT

A device for detecting and displaying the relative position of a generally horizontal reference plane of light, even when partial shading of the device occurs, produces a linear response that is independent of spot size and energy distribution. The device includes a photodetector means having first and second interdigitated photodetector elements positioned adjacent each other on the device. The first and second interdigitated photodetector elements provide first and second detection signals, respectively. A circuit means, responsive to the photodetector means, determines the relative levels of the first and second detection signals such that the position of the reference plane of light with respect to the detector device is determined. A display means, responsive to the circuit means, provides an indication of the position of the reference plane of light with respect to the detector device.

5 Claims, 4 Drawing Sheets

DETECTION AND DISPLAY DEVICE

This application is a continuation-in-part of U.S. application Ser. No. 228,465, filed Aug. 5, 1988, entitled DETECTION AND DISPLAY DEVICE, now Pat. No. 4,907,874.

BACKGROUND OF THE INVENTION

The present invention relates to equipment of the type used in surveying and construction and, more particularly, to a detector device for such an application which has improved photodetector means for detecting the Position or level of a reference Plane defined by a rotating laser beam or defined by a stationary plane of laser light.

Laser systems have been employed in surveying and construction in which a laser beam is rotated in either a horizontal or a graded plane. U.S. Pat. No. 4,062,634, issued Dec. 13, 1977, to Rando, illustrates a laser projector device which provides such a rotating reference beam. The rotating beam define a plane, and various measurements can be made using the as a reference For example, the elevation of a point remote from the laser beam projector device may be measured by means of a rod on which a laser beam detector is mounted. The bottom of the rod rests on the ground at the Point where the measurement is to be made, and the operator moves the detector along the rod to a position where it intercepts the laser beam, as indicated by a meter or other display on the detector device. One such detector device is shown in U.S. Pat. No. 4,240,208, issued June 30, 1987, to Petersen.

A similar surveying system is shown in U.S. Pat. No. 4,732,471, issued Mar. 22, 1988, to Cain et al. In the Cain et al system, a rotating beam is not used. Rather, a laser transmitter produces an alignment field by projecting laser energy in a non-planar, stationary reference cone. When the transmitter is level, this reference cone declines from the horizontal in an amount sufficient so that some compensation is provided for positional errors which occur due to the curvature of the earth. The Cain et al patent discloses a small, hand-held device which includes a display and a photodetector module.

Both of the detector devices shown in the Cain et al and Petersen patents include a pair of adjacent, triangularly shaped photodetector elements. The orientation of the photodetector elements is such that the changes in the signal outputs from the elements which occur due to movement of the light are inversely related. As the reference light moves upward, the signal output from one of the elements increases while the signal output from the other of the elements decreases. The opposite signal changes occur when the position of the reference light moves downward. Naturally, the signal levels are also affected by the intensity of the light source and the distance of the photodetector elements from the light source. By comparing the relative signal output levels from the two photodetector elements, however, it is possible to obtain an indication of the position of the reference light without regard to the absolute intensity of the light.

While such a detector arrangement provides accurate operation under varying conditions, it has been found to be subject to error in instances when the detector device is improperly oriented. The photodetector elements are positioned behind an aperture in the case of the detector device. If the detector device is misaligned by rotation about a vertical axis such that the light does not strike the elements at normal incidence, shading of the elements by the case at the edge of the aperture can occur. If the angle of incidence is large, the photodetector elements may be entirely shaded and the device will not function. This is an inconvenience for the operator, but is simply corrected by realignment of the device. More serious, however, is the situation in which the photodetector elements are only partially shaded. In this event, the two elements are not shaded equally, thereby producing a shift in the relative signal levels from the elements, and a corresponding error in the detected position of the reference light. Since the device provides an indication of light position, the operator may be unaware of the misalignment of the device and the resulting error in its operation.

One approach for improved detection and display of the relative position of a generally horizontal reference plane of light, even when partial shading occurs, is disclosed in the parent application, allowed U.S. patent application, Ser. No. 228,465, filed Aug. 5, 1988, by Ake now U.S. Pat. No. 4,907,874. The parent application discloses a detection and display device comprising photodetector means having first and second interdigitated photodetector elements positioned adjacent each other on the device, a circuit for determining the relative levels of detection signals produced by the detector elements, and a display. The photodetector elements are each made up of a plurality of sections which are arranged in a generally vertically oriented row. The heights of the sections of one of the elements increase from the bottom of the row to the top of the row, while the heights of the sections of the other element decrease from the bottom of the row to the top of the row. By this arrangement, shading of the elements along a vertical edge of the aperture does not affect the relative areas of the elements illuminated by a beam of light.

It has been found that this detection device responds accurately using a variety of helium-neon transmitters, regardless of partial shading, because the beam typically produced by a helium-neon transmitter is round in cross-section and has a Gaussian energy distribution. However, if the beam is narrow and too few of the sections of the elements are illuminated, a non-uniform response may occur. This occurs most often with laser diode transmitters where the resulting beam tends to be generally elliptically shaped. Where the generally elliptically shaped beam assumes an orientation in which the major axis of the spot of light falling on the cells is vertical, sufficient illumination of enough sections of both the first and second interdigitated photodetector elements occurs. A problem arises, however, when the generally elliptically shaped spot assumes an orientation in which its major axis is horizontal, in which case the vertical dimension of the beam is quite small and the number of illuminated cells is reduced.

An additional problem associated with this configuration of interdigitated photodetector elements disclosed in the parent application is the possibility of a nonlinear output resulting from a beam having a constant energy distribution, even when the beam is wide. As the beam is shifted upward, remaining a constant width, the relative outputs will remain constant until the bottom of the beam shifts out of the area of one element and the top of the beam shifts into the area of the other element. This results in a stair-step cell output ratio, instead of the desired linear response.

Accordingly, it is seen that there is a need for an improved device for detecting and displaying the relative position of reference light wherein the linear response is independent of spot size and energy distribution.

SUMMARY OF THE INVENTION

This need is met by a device according to the present invention for detecting and displaying the relative position of a generally horizontal reference plane of light, wherein the response of the device is linear and substantially independent of spot size and energy distribution. The device includes photodetector means, including first and second interdigitated photodetector elements positioned adjacent each other on the device, the first and second interdigitated photodetector elements providing first and second detection signals, respectively. The first and second interdigitated photodetector elements have a plurality of sections arranged in a generally vertically oriented row, wherein each section has at least one leg portion which is inclined with respect to the row. The device includes circuit means, responsive to the photodetector means, for determining the relative levels of the first and second detection signals such that the position of the reference plane of light with respect to the detector device is determined. Finally, the device includes display means, responsive to the circuit means, for providing an indication of the position of the reference plane of light with respect to the detector device.

In a preferred embodiment of the present invention, each section of the first and second interdigitated photodetector elements has three leg portions, each such leg portion being inclined with respect to the row. Additionally, each leg portion is inclined in an alternate direction with respect to the length of the row. Finally, each of the leg portions varies in dimension in a direction parallel to the row.

Accordingly, it is an object of the present invention to provide an improved device for detecting and displaying the position of a plane of light; to provide a device in which its response is independent of spot size and energy distribution; and to provide such h device in which a photodetector means includes a pair of interdigitated photodetector elements comprising a plurality of sections, wherein each section has alternately inclined leg portions.

Other objects and advantages of the invention will be apparent from the following description, the accompanying drawings and the appended claims.

DETAILED DESCRIPTION OF THE PREFERRED EMBODIMENT

Figure 1:
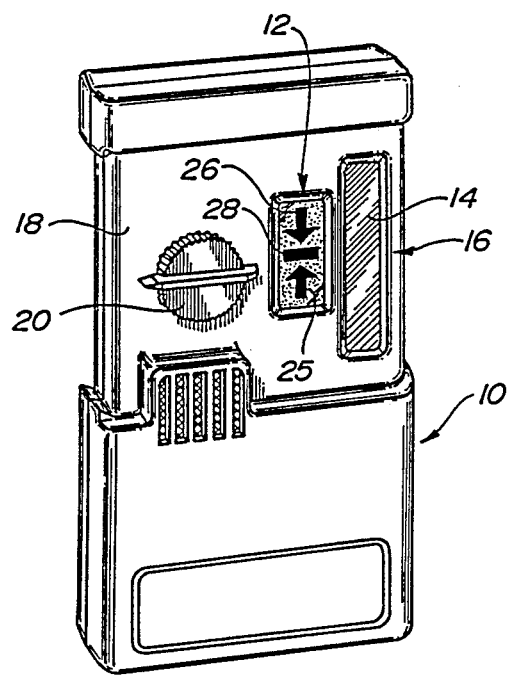
FIG. 1 is a perspective view of a detector device according to the present invention.
Figure 4:
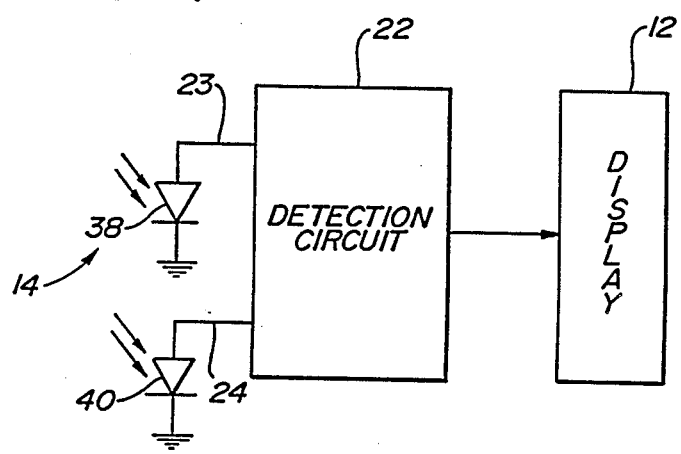
FIG. 4 is a block diagram of the circuitry of the detector device of the present invention.

Reference is made to FIGS. 1 and 4, which generally illustrate a detection and display device 10 according to the present invention. The device detects reference light and provides an indication of the location of the reference light with respect to the device. It is to be understood that the device 10 may be used with transmitters which provide either a stationary plane or field of light, or a rotating beam of light. Additionally, the light may be projected in a true plane, or in a conical shape or other shape to define a reference. Reference light may, for example, be produced by a device such as shown in U.S. Pat. No. 4,062,634, issued Dec. 13, 1977, to Rando et al, or by a device such as shown in U.S. Pat. No. 4,732,471, issued Mar. 22, 1988, to Cain et al, both of which are discussed above.

The detector device 10 includes a display 12, and a photodetector means 14 positioned in a window or aperture 16 defined by case 18. The detector device 10 is switched on by control knob 20 and then Positioned at the approximate height of the reference light. The light strikes the photodetector means 14, and a circuit means including detection circuitry 22, provides an indication on display 12 of the position of the reference plane of light with respect to the detector device. Specifically, the display 12 indicates whether the light is above, below, or within a reference band which is centered between the top and bottom of the photodetector means 14. (Although this discussion may make reference to the top or bottom of the device or a component, or to a horizontal orientation or a vertical orientation, it will be appreciated that these terms are presented as relative to each other, for ease of explanation and understanding, and that they are in no way intended to be limited to absolute orientations.)

The detection circuitry 22 is responsive to the photodetector means 14 for determining the relative levels of the first and second detection signals on lines 23 and 24, respectively, such that the position of the reference light may be determined. The display 12, which may for example be an LCD display, includes a pair of arrows 25 and 26, and a bar 28. Arrow 25 and arrow 26 are displayed if the beam is below or above the reference band. Bar 28 is displayed if the beam is within the band. Additionally, the display may provide an indication as to whether the light is above, below, or within a second, larger reference band, which is aligned with the first reference band. The details of the detection circuitry 22 by which this may be accomplished are described in the above identified Cain et al patent.

Figure 2:
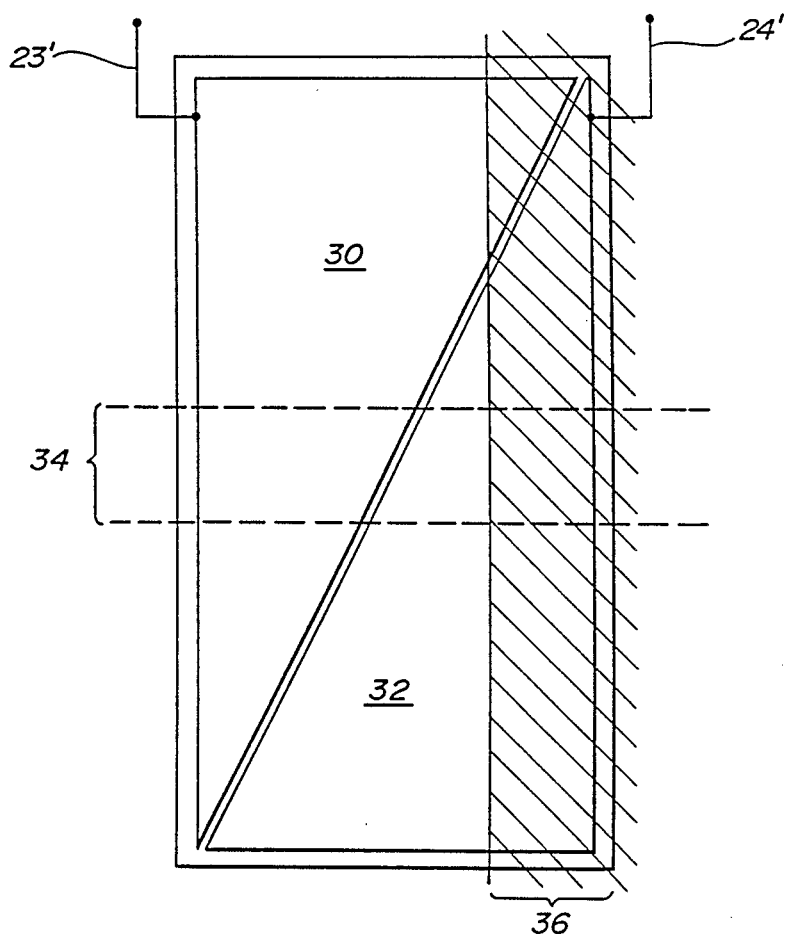
FIG. 2 illustrates a prior art configuration of photodetector elements.

As discussed above, prior art detection devices have utilized a pair of detection elements, each configured in a triangular shape, and positioned such that movement of the reference light vertically causes an increase in the output signal from one of the detection elements while at the same time causing an increase in the output signal from the other of the detection elements. This arrangement is illustrated in FIG. 2.

The elements 30 and 32 are positioned to intercept a plant of light 34. It will be appreciated that the level of the output signal from an element is directly related to the area of that element which is illuminated. As a consequence, movement of the light 34 upward increases the output signal from element 30 on line 23' and decreases the output signal from element 32 on line 24', while movement of the light 34 downward decreases the output signal from element 30 and increases the output signal from element 32.

When the detection device is misaligned by rotation about its vertical axis, a portion of the photodetector elements may be shaded from the light 34 by the case 18 at the side of the aperture 16. This results in light being blocked from hatched area 36. It will be apparent that element 30 will provide a higher level output signal in this situation than element 32, since a larger area of element 30 remains illuminated. As a consequence, the light 34 will be indicated as being higher than is actually the case. Since the device does provide an output, however, the operator may be unaware of this error.

Figure 3:
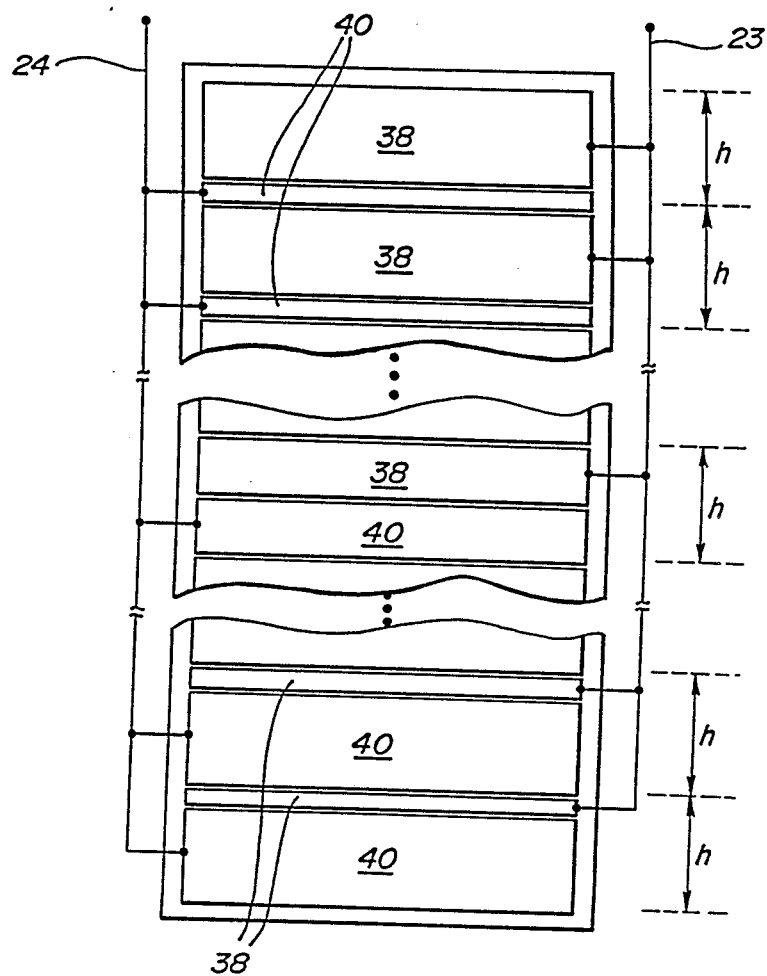
FIG. 3 is an enlarged view of one embodiment of the present invention with portions broken away, illustrating interdigitated photodetector elements according to the present invention.
Figure 5:
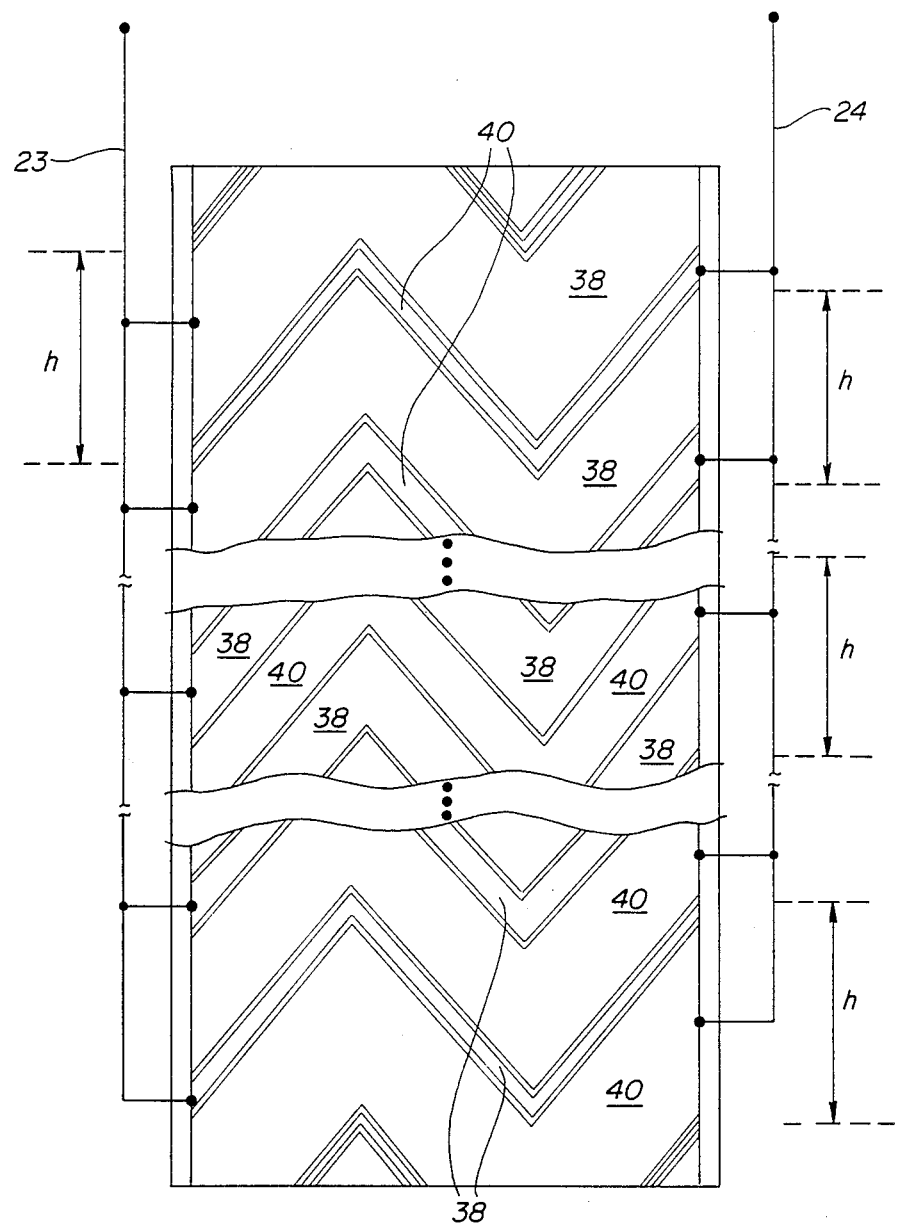
FIG. 5 is an enlarged view of a preferred embodiment of the present invention with portions broken away, illustrating interdigitated photodetector elements according to the present invention.

This problem is eliminated by the photodetector means 14 of the present invention, a first version of which is shown in FIG. 3 and a second version of which is shown in FIG. 5. The same reference numerals are used in FIGS. 3 and 5 to designate corresponding structures. Referring now to FIG. 3, the photodetector means 14 includes first and second interdigitated photodetector elements 38 and 40, positioned adjacent each other on the device. The first and second interdigitated photodetector elements 38 and 40 provide first and second detection signals on lines 23 and 24, respectively. The first photodetector element 38 is made up of a plurality of separate sections which are arranged in a generally vertically oriented row and electrically connected to line 23. Similarly, the second photodetector element 40 is made up of a plurality of sections which are electrically connected to line 24. Each section of the second photodetector element 40 is positioned between adjacent sections of the first photodetector element 38.

As is apparent from FIG. 3, the heights of the sections of the first photodetector element 38 increase from the bottom to the top of the row, and the heights of the sections of the second photodetector element 40 decrease from the bottom to the top of the row. This arrangement is provided so that the sum h of the height of a section of the first photodetector element 38 and the height of the section of the second photodetector element 40 directly therebeneath remains constant along the row.

As a consequence, it will be appreciated that relative levels of the output signals on lines 23 and 24 will provide an indication of the area which is illuminated along the row of element sections. If the light strikes the photodetector elements near the middle of the row, the two signal levels on lines 23 and 24 will be approximately equal. Illumination of the elements at the upper part of the row produces a higher level signal on line 23, whereas illumination of the elements at the lower part of the row produces a higher level signal on line 24. If the device is misaligned by rotation about a vertical axis to a degree sufficient to produce shading of the type illustrated in FIG. 2, both the first and second detection signals on lines 23 and 24 are reduced in amplitude. The relationship between these signals remains the same, however, since the relationship between the illuminated areas of the two interdigitated photodetector elements is unchanged.

Preferably, the sum h of the height of a section of the first photodetector element 38 and the height of the section of the second photodetector element 40 directly therebeneath is no greater than approximately one-half the vertical thickness of the reference plane of light. It will be appreciated that this ensures that enough of the sections of both elements are illuminated that the desired relationship between the first and second detection signals is obtained.

The beam typically produced by a helium-neon laser transmitter generates a uniform response with the Photodetector element configuration of FIG. 3 because such a light beam is round in cross-section and has a Gaussian energy distribution. The round cross-sectional beam usually illuminates enough of the sections of both elements 38 and 40 in FIG. 3 to obtain the desired relationship between the first and second detection signals. However, if too few of the sections of both elements are illuminated, a non-uniform response may occur. This is most often the case with laser diode transmitters where the resulting beams tends to be generally elliptically shaped. Where the generally elliptically shaped beam assumes an orientation in which the major axis of the spot of light falling on the cells is vertical, sufficient illumination of enough sections of both elements 38 and 40 occurs. A problem arises, however, when the generally elliptically shaped spot assumes an orientation in which its major axis is horizontal. With such an orientation, the beam is quite narrow and the number of cells averaged is reduced.

Additional problems may also be encountered with the configuration illustrated in FIG. 3. First, if the light beam is sufficiently narrow, only one element 38 or 40, but not the other, may be illuminated. This would indicate only that the beam cuts a section of the particular element being illuminated, but would not indicate which section along the row. Second, even with a wide beam, ambiguous results may be produced. For example, as a beam is shifted vertically, the output signal of element 38 remains constant until the beam crosses the bottom of a section of the element 38. Consequently, a stair-step effect is generated which may result in non-linearity even with a wide beam.

A second embodiment of the present invention, as shown in FIG. 5, solves for these problems by providing interdigitated photodetector elements 38 and 40, each section of which preferably has three alternately inclining leg portions with respect to the length of each row. In FIG. 5, the first and second interdigitated photodetector elements 38 and 40 are positioned adjacent each other on the device and provide first and second detection signals on lines 23 and 24, respectively. The first photodetector element 38 is made up of a plurality of separate sections which are arranged in a generally vertically oriented row and electrically connected to line 23. Similarly, the second photodetector element 40 is made up of a plurality of sections which are electrically connected to line 24. Each section of the second photodetector element 40 is positioned between adjacent sections of the first photodetector element 38.

As is apparent from FIG. 3, the linear response of the device is independent of the beam width or spot size. No matter how narrow a beam is, it will always cut across some portion of at least one section of each of the photodetector elements 38 and 40. Additionally, with the configuration shown in FIG. 5, the linear response is independent of the energy distribution of the beam because the illuminated portions of each section will change as the beam is shifted up or down the photodetector means 14. Consequently, the ambiguity present with the configuration of FIG. 3 is corrected.

In one embodiment of the present invention, the leg portions of each section may be gradually tapered. That is, the height of each section may vary as the leg portion inclines to produce an even more uniform cell ratio output. The heights of the sections along the length of the row of photodetector elements linearly changes to facilitate the generation of a linear response, independent of spot size and energy distribution.

Having described the invention in detail and by reference to the preferred embodiment thereof, it will be apparent that other modifications and variations are possible without departing from the scope of the invention defined in the appended claims.

What is claimed is:

1. A device for use with a transmitter which produces a beam of light having an energy distribution, the device capable of detecting and displaying the relative position of a generally horizontal reference plane of light, said device generating a linear response which is independent of beam size and energy distribution, comprising:

photodetector means, including first and second interdigitated photodetector elements positioned adjacent each other on said device, said first and second interdigitated photodetector elements providing first and second detection signals, respectively, said first and second interdigitated photodetector elements having a plurality of sections arranged in a generally vertically oriented row, wherein each section has at least one leg portion which is inclined with respect to said row, circuit means, responsive to said photodetector means, for determining the relative levels of said first and second detection signals such that the position of said reference plane of light with respect to said detector device is determined, and display means, responsive to said circuit means, for providing an indication of said position of said reference plane of light with respect to said detector device.

2. The device of claim 1 for detecting and displaying the relative position of a generally horizontal reference plane of light, in which each section of said first and second interdigitated photodetector elements has three leg portions, each such leg portion being inclined with respect to said row.

3. The device of claim 2 for detecting and displaying the relative position of a generally horizontal reference plane of light, in which each said leg portion is inclined in an alternate direction with respect to the length of said row.

4. The device of claim 2 for detecting and displaying the relative position of a generally horizontal reference plane of light, in which each of said leg portions vary in height along the row.

5. The device of claim 1 for detecting and displaying the relative position of a generally horizontal reference plane of light, in which said sections are generally chevron shaped.

* * * * *